Patent Number: 4,490,412
Date of Patent: Dec. 25, 1984

[54] METHOD OF MAKING A SOLAR ENERGY COLLECTOR ELEMENT

[75] Inventors: Masahiko Yotuyanagi; Toshio Fukaya, both of Yokohama, Japan

[73] Assignee: Tokyo Shibaura Denki Kabushiki Kaisha, Kawasaki, Japan

[21] Appl. No.: 384,397

[22] Filed: Jun. 2, 1982

[30] Foreign Application Priority Data

Jun. 4, 1981 [JP] Japan .................. 56-84919

[51] Int. Cl.$^3$ .......... B05B 5/00; B05D 5/00; B05D 5/12; C23C 11/10
[52] U.S. Cl. .................. 427/122; 427/160; 427/162; 148/6.35
[58] Field of Search .......... 148/6.35; 427/160, 162, 427/122

[56] References Cited

U.S. PATENT DOCUMENTS 4,097,311 6/1978 Ishibashi et al. .......... 148/6.35 X
4,212,933 7/1980 Markin et al. .......... 427/122 X

FOREIGN PATENT DOCUMENTS 52-95340 8/1977 Japan .
53-84240 7/1978 Japan .

Primary Examiner—Michael R. Lusignan
Attorney, Agent, or Firm—Schwartz, Jeffery, Schwaab, Mack, Blumenthal & Koch

[57] ABSTRACT

There is disclosed a method of making a solar energy collector element which comprises the step of forming a carbon containing film on at least the sunlight receiving surface of a substrate which is made of an iron metal material, and then heat-treating at least the sunlight receiving surface in an oxidizing atmosphere. The solar energy collector element made by the method of the present invention is superior in selective absorption characteristics for the solar energy and inexpensive in manufacturing.

7 Claims, 3 Drawing Figures

METHOD OF MAKING A SOLAR ENERGY COLLECTOR ELEMENT

BACKGROUND OF THE INVENTION

The present invention relates to a method of making a solar energy collector element and more particularly, to such element which is superior in selective absorption characteristics for the solar energy and inexpensive in manufacturing.

There have been developed and practically used solar systems such as electric generator systems, solar houses and others which utilize the solar energy as a source of substantial non-pollution energy instead of energies from coal and petroleum. These solar systems utilize solar energy collector elements each including a solar energy collecting film or surface (called selective absorption film or surface) formed at the side of receiving the sunlight, the solar energy collecting film or surface having characteristics that it is high in absorption efficiency of the solar energy and less in release of the stored heat energy. It has been believed that ideal selective absorption film or surface has such spectral characteristics that the reflection factor is lower for electromagnetic waves in a zone including wavelengths in the range of 0.3 to 2.5 $\mu$m which is mainly of visible rays and near infrared radiations and includes most of the solar energy, and higher for electromagnetic waves in another zone including wavelengths over 2.5 $\mu$m which is mainly of infrared radiation and includes most of radiation energy on heat reserve. That is, such spectral characteristics provide a reduced rate of radiation.

There have been known the following methods of making solar energy collector elements which have such a selective absorption film or surface;

(i) A method of treating a substrate of aluminium into black color by the steps of anodizing the aluminium substrate and subjecting the aniodized substrate to secondary electrolysis to deposit copper, nickel and others thereon (Japanese provisional patent publication No. 20195/1981), a method of forming a film on the surface of a copper substrate with the film being of copper oxide or black chromium, black nickel or the like which is formed by electroplating (Solar Energy, Vol. 19, 1977; J. Vac. Sci. Technol., Vol. 13, No. 2 Mar./Apr., 1976), and a method of vapor-depositing a layer of aluminium on a glass plate and then coating on the aluminium layer with a film of chromium oxide (Japanese provisional patent publication No. 87738/1977), (ii) a method of applying a coating material containing a pigment of semiconductor particles of silicon or the like to a metal surface of Al, Fe, Ag, Ni, Cr or others (Japanese provisional patent publication No. 146353/1980), and (iii) a method of forming a coherent multilayered film on a metal surface by the use of vacuum deposition or chemical deposition (Thin Solid Films, Vol. 39, 1976, P. 87).

Solar energy collecting films or surfaces made by the above methods (i) and (ii) are of transparent semiconductor films or surfaces which quite absorbs visible rays and near infrared rays. Accordingly, such films or surfaces have satisfactory selective absorption characteristics for the sunlight. However, they are inferior in absorption efficiency for infrared rays because of the transparent semiconductor films or surfaces. The above methods (i) are disadvantageous in that they are higher in manufacturing cost because of the expensive materials used such as aluminium and copper and that they are troublesome in process because of the treatment such as deposition and plating, resulting in inferior mass-productivity. They also have problems in pollution due to the waste liquid exhausted on chromium-plating and others. The above method (ii) has a disadvantage in that the solar energy collecting surface made according to this method has higher surface reflection because silicon particles used as a pigment have higher refractive index for the sunlight, resulting in reduced absorption efficiency. Further, the above method (iii) provides such a product that is generally lower in selective absorption characteristics, but must be produced according to a complicated process while being improved in above-mentioned surface reflection.

In order to overcome the problems in the aforementioned methods, there has been developed methods wherein metal materials of relatively inexpensive irons are used as substrates. These methods include a method of annealing a sheet of steel to deposit the carbon on the steel in the form of graphite (Japanese provisional patent publication No. 156434/1977); a method of forming a film of $Fe_3O_4$ on the surface of carbon steel or the like by dipping it in an alkaline solution which is produced, for example, by dissolving sodium chloride, sodium phosphate, sodium nitrite or the like into distilled water or demineralized water (Japanese provisional patent publication No. 75132/1978); a method of causing a chemical treating liquid containing copper ions to act on the surface of a substrate made of an iron metal material and treating the surface into black color as well as depositing fine metal copper particles (Japanese provisional patent publication No. 84240/1978) and so on.

However, the characteristics of selective absorption films or surfaces obtained according to these methods were not necessarily satisfactory.

Namely, the above method of depositing the graphite by annealing must use steel sheets of high carbon content and the obtained products have insufficient selective absorption characteristics. Such steel sheets are inferior in workability and welding property. Accordingly, it is difficult to obtain the desired solar energy collecting plate which is satisfactory in thickness. The above method of dipping the carbon steel in the alkaline solution has problems in safety of operation and control of bath because the alkaline solution used is concentrated. The above method of depositing copper is disadvantageous in that management of bath is troublesome since the chemical treating liquid containing copper ions is used therein and that the waste liquid provides a source of pollution and so on.

SUMMARY OF THE INVENTION

The present invention is directed to overcome the aforementioned problems in the prior art methods for making solar energy collecting elements.

It is an object of the present invention to provide a method of making a solar energy collector element which is superior in selective absorption characteristics for the solar energy and can inexpensively be manufactured.

Namely, according to the present invention, a method of making a solar energy collector element is characterized by the steps of forming a carbon containing film on at least the sunlight receiving surface of a substrate made of an iron metal material and then heat-treating at least said sunlight receiving surface in an oxidizing atmosphere.

DETAILED DESCRIPTION OF PREFERRED EMBODIMENTS

Figure 1:
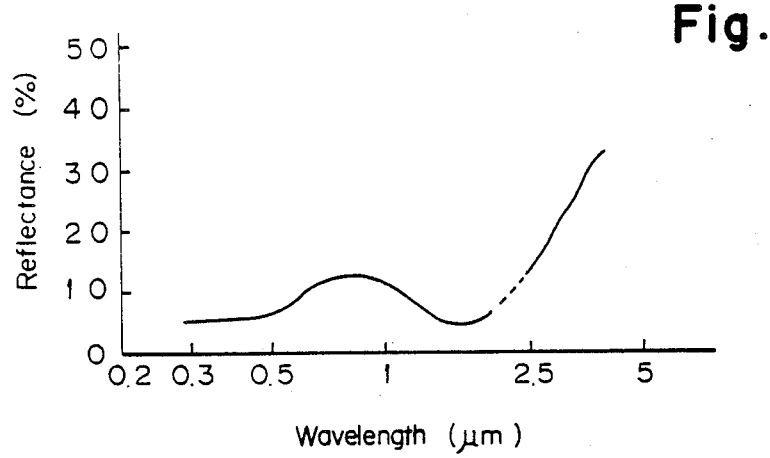
FIGS. 1 and 2 show curves of spectral reflections on the sunlight receiving surfaces of solar energy collector elements produced according to the present invention and in the prior art, respectively.

In the present invention, the term "sunlight receiving surface" represents the top surface of a flat plate-shaped solar energy collecting element used, for example, in a solar energy collector of a solar house or the like or in a vacuum type solar energy collector, the outer surface of a converging type solar energy collecting pipe, and all the sun-striked surfaces of a solar energy collector having a circular shape, T-shape or others. In short, it designates a surface which will receive the sunlight directly or indirectly.

There will now be described a method of the present invention for making a solar energy collector element in more detail.

First of all, a carbon containing film is formed on at least the sunlight receiving surface of a substrate which is made of an iron metal material. The formation can be effected by the following processes: For example, a process comprises the steps of applying a liquid dispersion of amorphous carbon such as carbon black (e.g., furnace black, acetylene black, lamp black, etc.) or the like or powdered carbon such as graphite or the like, for example, in water or aqueous organic medium such as lower alcohol having one to six carbon atoms, acetone, cyclohexanone, methyl ethyl keton or the like to at least the sunlight receiving surface of a substrate by the use of spraying, roll coater, dipping or others and drying it. Another process comprises the steps of dipping the substrate in the liquid dispersion containing said carbon powder, removing it before drying. Still another process comprises the steps of applying an organic polymer resin carbonizable under heat-treating such as phenolic resin, furan resin, urea resin, melamine resin and so on to at least the sunlight receiving surface of the substrate by the use of spraying, roll coater, dipping or others and then heat-treating it at a temperature in the range of 200° to 1,100° C.

Where the liquid dispersion containing the carbon powder is used, the amount of carbon powder in the dispersion may be enough to be able to form a carbon containing film having the desired thickness. Such amount is preferably in the range of 0.05 to 20% by weight, more preferably in the range of 0.3 to 5% by weight relative to the weight of the dispersion. Preferably, the liquid dispersion includes the aqueous organic medium as more as possible so as to more rapidly dry the wet film applied to the substrate. The amount of aqueous organic medium added in the liquid dispersion is preferably in the range of 0 to 100% by weight, more preferably in the range of 10 to 80% by weight relative to the entire weight of the dispersion. The applied film is preferably air-dried, but it may be heated and dried at a raised temperature of about 100° C. without hindrance.

In the process of heat-treating after applying the organic polymer resin, the organic polymer resin is preferably used after it has been suitably adjusted in viscosity by dilluting the polymer with any suitable organic solvent such as methyl ethyl ketone, benzene, toluene, xylene, ethyl acetate, acetone, cyclohexanone or others.

In the present invention, furthermore, processes other than the aforementioned processes may be used for forming the carbon containing film on the substrate. For example, there are vacuum deposition, chemical deposition and flame spray coating including gas flame spraying and plasma flame spraying. It is however preferred that the previously mentioned processes are used in consideration of inexpensiveness and simplicity in manufacturing.

After forming the carbon containing film, at least the sunlight receiving surface of the substrate is heat-treated in an oxidizing atmosphere to provide a black-colored surface on which a film containing carbon, iron carbide and iron oxide is formed. The thickness of the final film is preferably in the range of 0.05 to 5 μm, more preferably in the range of 0.1 to 3 μm. If the thickness thereof is less than 0.05 μm, the absorption of the sunlight is not sufficient. On the other hand, if the thickness of the film exceeds 5 μm, the rate of radiation is increased as high as in the general coating materials although the sunlight absorption is increased.

The aforementioned oxidizing atmosphere may be any suitable atmosphere in which the oxidation can proceed in said carbon containing film and iron metal material. For example, there are air atmosphere, atmosphere being relatively high in partial pressure of oxygen gas, atmosphere containing steam and air atmosphere containing a slight amount of reducing substance such as hydrogen, carbon monoxide, hydrocarbon or the like.

The temperature in heat-treatment is preferably in the range of 200° to 1,100° C. depending on the kinds of iron metal material used. If this temperature is less than 200° C., the oxidized film of iron is insufficiently formed resulting in unsatisfactory selective absorption characteristics. On the other hand, if the temperature exceeds 1,100° C., the oxidative degradation of iron base material is increased with the carbon containing film being completely oxidized.

The iron metal materials which can be used in the present invention may be any suitable materials which can normaly be used to make solar energy collector elements. For example, there are malleable iron, soft steel, carbon steel, low-alloy steel, stainless steel, alloy steel and so on.

The method according to the present invention provides a solar energy collector element by forming a carbon containing film on at least the sunlight receiving surface of a substrate and then heat-treating at least said sunlight receiving surface in an oxidizing atmosphere to provide the black color to said sunlight receiving surface and to form a film having a satisfactory adhesion and including carbon, iron carbide and iron oxide, the last-mentioned film having an excellent selective absorption characteristics for the solar energy.

The solar energy collector element produced according to the present invention is superior in selective absorption characteristics for electromagnetic waves having wavelengths in the range of 0.3-2.5 μm which include most of the solar energy. At the same time, it is higher in reflection factor for electromagnetic waves having wavelengths above 2.5 μm which include most of the energy radiated on heat reserve. Thus, the solar energy collector element of the present invention has superior in absorption efficiency of the solar energy and effectively prevents the dispersion of stored heat energy due to the radiation. Further, the solar energy collector element of the present invention can maintain the above characteristics stable for a prolonged period of time.

The method of the present invention is thus useful for making a solar energy collector element which can effectively be utilized in solar energy collectors in solar houses, vacuum type solar energy collectors and converging type solar energy collectors used for solar energy generators.

The present invention will now be descriibed in more detail with reference to examples which are not intended to limit the invention

EXAMPLE 1

The top face (corresponding to the sunlight receiving surface) of a plate made of soft steel and having a thickness of 0.5 mm was abraded by the use of #240 wet abrasive paper. This steel plate was then dipped in a liquid mixture consisting, by weight, of 0.7% carbon black, 0.3% glue, 20% water and 79% ethanol, for one minute. After removing, the steel plate was then dried to form a carbon containing film on the top face thereof.

Thereafter, this soft steel plate was subjected to heat treatment at a temperature of 400° C. for one minute in an air atmosphere furnace to treat the top face of the soft steel plate into black color and to form a film containing carbon, iron carbide and iron oxide thereon.

The composition in the film formed on the top face of the soft steel plate was identified by the use of X-ray diffractometry. As a result, it was found that this film contained chief ingredients of carbon and iron oxide and the balance of iron carbide.

For comparison, a solar energy collector element was prepared by the use of the same material and process as in the Example 1, except that the heat treatment was not carried out after forming the carbon containing film.

Figure 2:
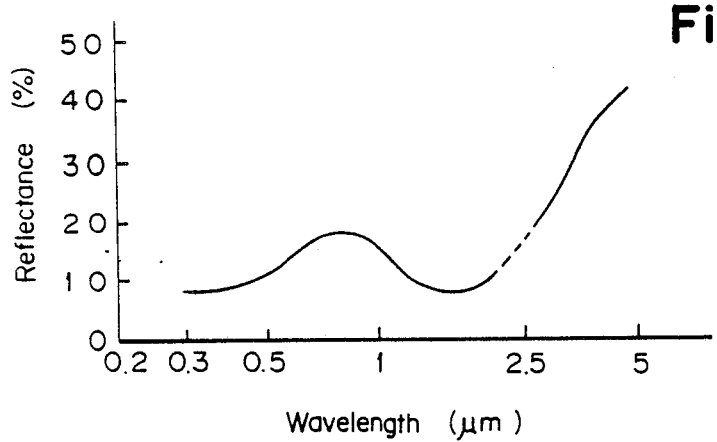

The solar energy collector elements obtained according to the present invention and for comparison were measured in spectral reflectance on the respective sunlight receiving surfaces. The results are shown in FIGS. 1 and 2. For comparison, the distribution of radiation energy in the sunlight disclosed in CIE publication, No. 16, E3 . 2 (1970) is shown in FIG. 3.

Figure 3:
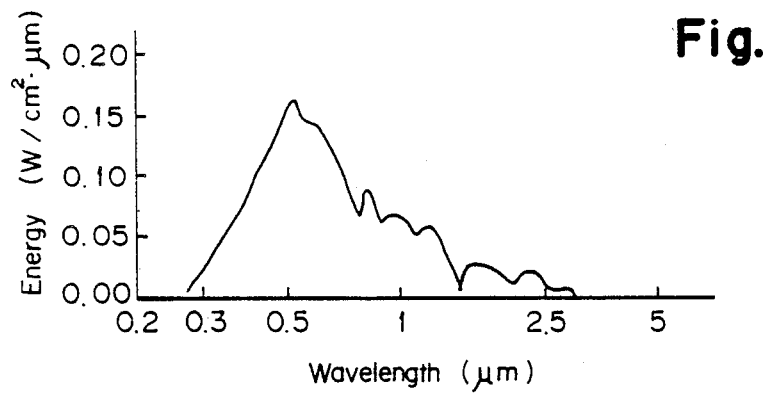
FIG. 3 is a graph showing a distribution of spectral radiation energy in the sunlight.

As can be seen from FIGS. 1, 2 and 3, the solar energy collector element of the present invention has a sunlight receiving surface having extremely low reflection factor for light rays in a zone of wavelength in the range of 0.3–2.5 $\mu$m which includes most of the solar energy, in comparison with the prior art solar energy collector element produced only by applying the black colored coating including carbon powder. The solar energy collector element of the present invention has lower reflection factor, 4%, particularly for light rays having wavelengths near 0.5 $\mu$m in which the intensity of radiation in the sunlight is strongest. In the solar energy collector element prepared for comparison, such reflection factor is of about 8%. Furthermore, the solar energy collector element according to the present invention is extremely high in reflection factor, 85–95%, for light rays in a zone of wavelengths in the range of 7–11 $\mu$m in which the intensity of radiated electromagnetic waves is strongest on heat reserve.

The respective sunlight receiving surfaces of the solar energy collector elements according to the present invention and for comparison were calculated with reference to the solar energy absorption rate $\alpha$ on the spectral reflection curves of the sunlight shown in FIGS. 1, 2 and 3 and the radiation rate $\epsilon$ on a distribution of wavelengths in the radiated energy of a black body at 90° C. which was obtained from the Plank's law. The solar energy collector elements according to the present invention and for comparison had the absorption rate $\alpha$ of 0.93 and 0.87 and the radiation rate $\epsilon$ of 0.11 and 0.20, respectively.

As be apparent from the foregoing, the solar energy collector element made according to the present invention has an excellent selective absorption characteristics for the solar energy.

Assuming that the solar energy collector element of the present invention will be used in a vacuum type solar energy collector, it was kept intact at a temperature of 200° C. for one week under vacuum of $10^{-4}$ Torr. The sunlight receiving surface thereof was not corroded. Further, the above values $\alpha$ and $\epsilon$ were not changed at all. Thus, the solar energy collector element of the present invention maintained its stable properties without any degradation in selective absorption characteristics.

EXAMPLE 2

The top face (corresponding to the sunlight receiving surface) of a bright-treated steel plate and having a thickness of 0.5 mm was washed with trichloroethylene.

Then, the bright-treated steel plate was coated with a liquid mixture consisting, by weight, of 1.0% carbon black, 0.4% glue, 25% water and 63.6% ethanol, to the surface by use of a spray gun. The bright-treated steel plate was then dried to form a carbon containing on the top face thereof.

Thereafter, this bright-treated steel plate was subjected to heat treatment at a temperature of 400° C. in an air atmosphere of high frequency furnace to treat the top face of the bright-treated steel plate into black color and to form a film containing carbon, iron carbide and iron oxide.

The composition of the so formed film on the top face of the steel plate was identified by the use of X-ray diffractometry as in the Example 1. As a result, it was similarly found that the composition consisted of chief ingredients of carbon and iron oxide and the balance of iron carbide.

The sunlight receiving surface of this solar energy collector element was measured in spectral reflectance as in Example 1. As a result, it was found that the solar energy collector element had substantially the same selective absorption characteristics as those of the solar energy collector element obtained in Example 1.

We claim:

1. A method of making a solar energy collector element, comprising the steps of:
   applying a carbon-containing material on at least a sunlight-receiving surface of a substrate which comprises an iron material; and
   heating at least said sunlight-receiving surface at a temperature in the range of about 200° to about 1,100° C. to form on said substrate a film comprising iron oxide, said heating being carried out in a gaseous oxidizing atmosphere selected from the group consisting of an air atmosphere, an atmosphere containing oxygen, an atmosphere containing steam, and an air atmosphere containing a small amount of at least one selected from the group consisting of hydrogen, carbon monoxide, and hydrocarbon.

2. The method as defined in claim 1, wherein said applying of said carbon-containing material comprises applying a liquid dispersion containing carbon powder to the substrate or dipping the substrate in said liquid dispersion and thereafter drying said substrate.

3. The method as defined in claim 2, wherein said liquid dispersion containing carbon powder is obtained by dispersing at least one carbon powder selected from a group consisting of carbon black and graphite in water and/or an aqueous organic medium.

4. The method as defined in claim 1, wherein said applying of said carbon-containing material comprises applying at least one organic polymer resin selected from a group consisting of phenolic resin, furan resin, urea resin and melamine resin to the sunlight receiving surface of said substrate and then carbonizing said resin to form said carbon-containing material.

5. The method as defined in claim 1, wherein said carbon-containing film has a thickness in the range of 0.05–5 $\mu$m after said heat-treating in an oxidizing atmosphere.

6. The method as defined in claim 1, wherein said iron material is selected from a group consisting of malleable iron, soft steel, carbon steel, low-alloy steel, stainless steel and alloy steel.

7. A method as defined in claim 2, wherein said carbon black is selected from the group consisting of furnace black, acetylene black, and lamp black.

* * * * *